July 14, 1959  J. F. ZISKAL  2,894,492
PRESSURE RESPONSIVE LIMITED MOVEMENT VALVE
MECHANISM FOR HYDRAULIC SYSTEM
Filed July 19, 1957  3 Sheets-Sheet 3

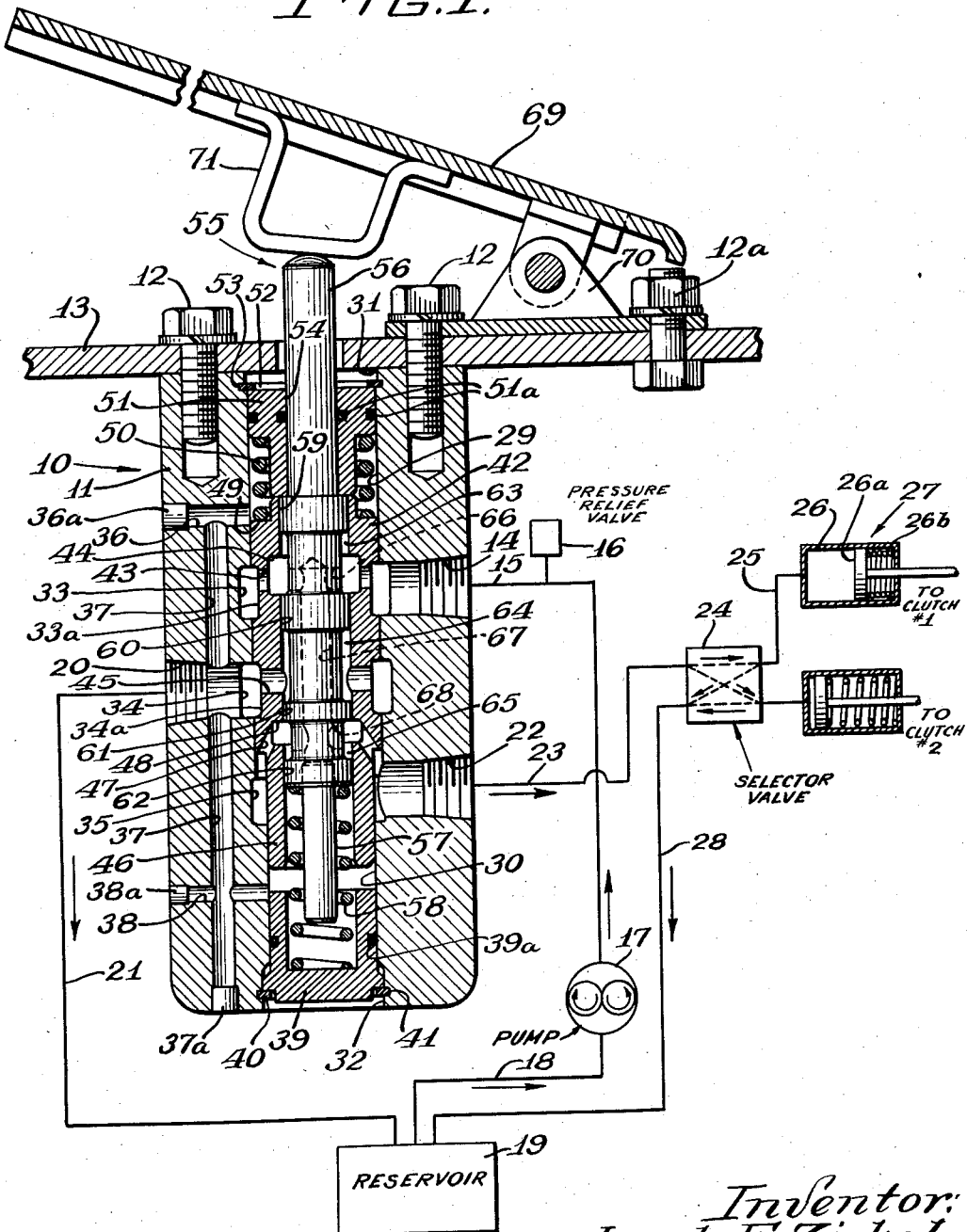

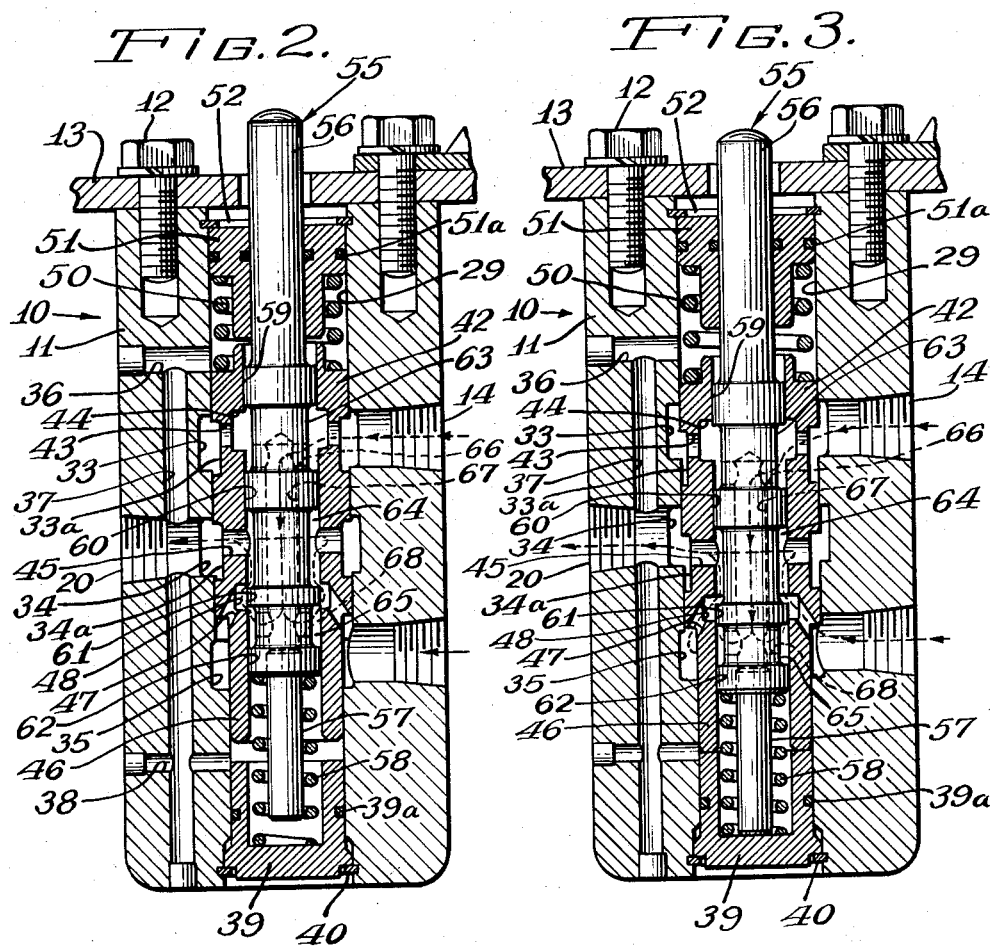

Inventor:
Joseph F. Ziskal

United States Patent Office 2,894,492
Patented July 14, 1959

2,894,492

PRESSURE RESPONSIVE LIMITED MOVEMENT VALVE MECHANISM FOR HYDRAULIC SYSTEM

Joseph F. Ziskal, Sprotborough, Doncaster, England, assignor to International Harvester Company, Chicago, Ill., a corporation of New Jersey Application July 19, 1957, Serial No. 673,085

12 Claims. (Cl. 121—41)

This invention relates generally to hydraulics but is more particularly concerned with a valve mechanism for controlling the operation of hydraulically actuated apparatus in a hydraulic circuit.

Heretofore, a variety of devices and mechanisms have been developed for controlling the operation of fluids under pressure, and for operating various types of hydraulically actuated mechanisms such as the clutching equipment in vehicle automatic transmissions, as well as in many forms of servo-mechanisms, and the present invention is directed to an improved form of one such valve adaptable for use with devices of this character.

While the prior art valve devices have assumed many forms and were developed for performing many different specific functions in the operation and control of hydraulic systems, the particular species of valve mechanisms that were directed to providing varying operable means for permitting limited movement for hydraulic motors and other similar hydraulically actuated apparatus have not, for one reason or another, been entirely satisfactory. In the operation of hydraulic systems it is frequently desirable to be able to motivate the operated apparatus therein in limited incremental amounts without effecting full engagement or disengagement of the operated apparatus, such as might be required to creep or slowly inch a vehicle into or away from a working position, but the prior art mechanisms heretofore developed for this particular feathering or incremental movement type of operation have not proven entirely satisfactory. Therefore, the present invention is directed to the specific type of device, frequently referred to as the pressure-responsive type of valve, that will permit the effective accomplishment of such incremental or feathering movement during operation of associated actuated apparatus.

A primary object of the present invention is to provide throttle valve means wherein a pressure sensing mechanism is effective for controlling fluid under pressure in a hydraulic circuit.

Another general object is to provide a simple and improved pressure-responsive hydraulic valve for use in hydraulic systems.

A more specific object is to provide a spool and follower type of hydraulic valve in a hydraulic system wherein the follower element is responsive to pressure within the valve for controlling the movement of hydraulically actuated apparatus associated with said system.

A further object is to provide a valve mechanism having throttling means therein that is operable for controlling the rate of flow of fluid under pressure admitted to and exhausted from hydraulically actuated apparatus.

An important object is to provide a feathering action hydraulic valve of the type wherein a pressure-responsive sleeve-like bushing interposed between the spool and the bore of the valve body follows the action or movement of the valve spool to regulate the admission and exhaustion of fluid pressure to and from associated hydraulically actuated apparatus.

Another important object is to provide an inexpensive, smooth operating, effective and flexible pressure-responsive valve for effecting control of the movement of hydraulically actuated apparatus, and for maintaining pressure within said apparatus in each of a multitude of actuated positions thereof.

The foregoing and other objects and features of the invention will become apparent as the disclosure is more fully made in the following detailed description of a preferred embodiment of the invention as illustrated in the accompanying sheets of drawings in which:

Figure 1 is a vertical longitudinal sectional view taken through a control valve mechanism fashioned according to the present invention, the elements thereof being shown in position to cause an associated hydraulically actuated clutch to assume an engaged position, and also showing in diagrammatic form a hydraulic system wherein the valve mechanism has been incorporated;

Figure 2 is a view similar to Figure 1 but showing the elements of the valve mechanism in the position assumed when the foot treadle has been partially depressed and the associated clutch mechanism has started to disengage;

Figure 3 is a view similar to Figure 2 but showing the elements of the valve mechanism in the position assumed when the foot treadle has been fully depressed and the associated hydraulic clutch has been fully released or disengaged;

Figure 4:
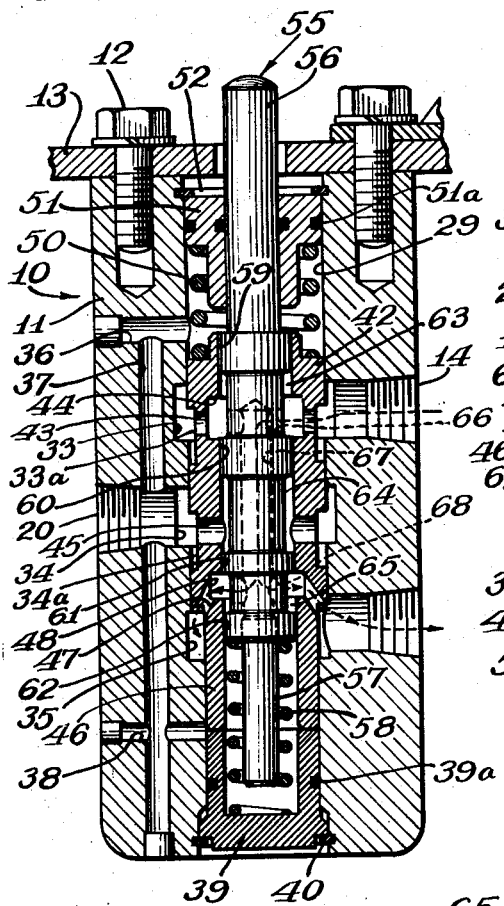
Figure 4 is a view showing the position of the valve elements after the foot treadle has been partially released and started on its upward movement prior to starting engagement of the hydraulic clutch in the system.

Reference to the drawings will show that the particular embodiment selected for illustrating a suitable preferred application of the proposed valve mechanism incorporates it in a hydraulic circuit or system, such as may be used with a vehicle automatic transmission. A valve mechanism, indicated generally by the reference character 10, is fashioned with a body or casing 11 that is suitably mounted by bolt means 12 on a support base such as the platform or floor member 13 which forms a portion of the vehicle (not shown) into which the device is incorporated. An inlet port opening 14 in said casing is connected by a conduit 15 to a conventional pressure relief valve 16 and to the outlet of an hydraulic pump 17 the inlet of which pump is connected by a conduit 18 to a fluid reservoir 19. An exhaust port opening 20 of said valve casing is connected by conduit 21 with the reservoir 19, and a discharge or apparatus-connecting port opening 22 thereof is connected by conduit 23 with a selector valve 24 while an outlet of said latter valve is connected by conduit 25 with the hydraulic cylinder 26 of a clutch actuating mechanism, indicated generally by the reference character 27. A return conduit line 28 connects the selector valve 24 with reservoir 19.

The selector valve 24 shown in diagrammatic form may be of the type such as is illustrated and described in pending U.S. patent application Serial No. 607,649 filed September 4, 1956, now Patent 2,852,959 and assigned to the same assignee as that of the present invention, but since this particular selector device is not essential to the successful operation of this invention it was felt that further detailed explanation thereof was unnecessary for a proper understanding of the present invention.

The casing 11, in addition to the ports 14, 20 and 22, is provided with a central longitudinally extending bore 29 having a reduced or stepped portion 30 in one end thereof. One end of said bore has an enlarged portion 31 while the opposite end has an enlarged portion 32 both of which are provided for purposes which will presently be more clearly understood.

Adjoining the interior opening of inlet port 14 in the bore 29 there is provided an annular groove or annulus 33, and adjacent the interior of exhaust port 20 there is provided a similar annulus 34 both of which have an axial dimension substantially conforming with that of the diameter of their respective adjoining port openings. An annulus 35 adjoining the work or load port opening 22 has an axial dimension slightly smaller than the diameter of its adjoining port opening and is slightly offset axially therefrom. A transverse passage 36 in the casing 11 extends into the bore 29 and is connected by a longitudinally extending passage 37 with the exhaust or outlet port opening 20, while a similar transverse passage 38 at the opposite end of the bore is also connected by the longitudinal passage 37 with said exhaust port opening. Closure plugs 36a, 37a, and 38a, may be provided to suitably close and seal the open ends of said three latter passages.

A stop or closure bushing 39 is fixedly positioned in the reduced end portion 30, of bore 29, and may be secured in place by suitable means, such as the snap ring 40 which is received in an annular groove 41 in the enlarged portion 32 of said bore.

Figure 5:
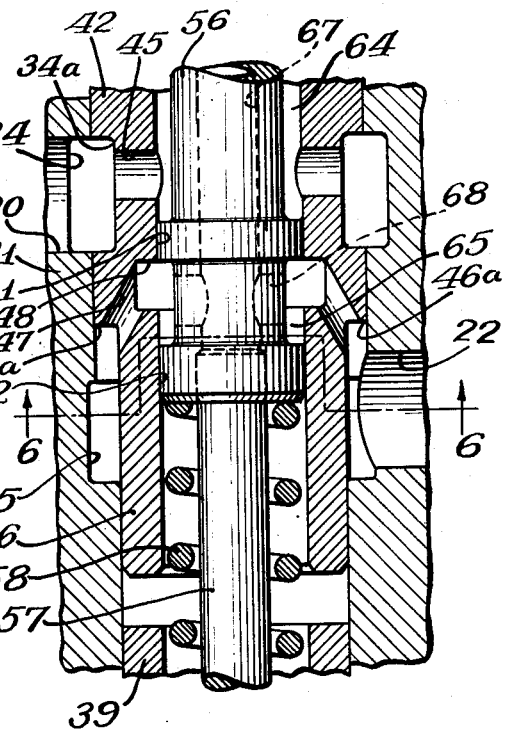
Figure 5 is a fragmentary view, in enlarged dimensions, of a lower portion of the valve mechanism shown in Figure 1.
Figure 6:
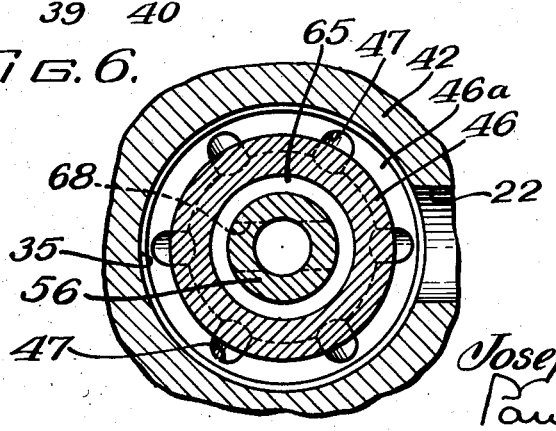
Figure 6 is a horiznotal fragmentary sectional view taken on line 6—6 of Figure 5.

Positioned within the bore 29 is a stepped longitudinally extending sleeve-like bushing 42 which is dimensioned for slidable movement therewithin. An annulus 33a on the exterior of said sleeve is dimensioned with the same axially extending dimension as that of the proximate annulus 33 with which it cooperates, and a plurality of radially extending openings 43 connect this exterior annulus 33a with an interior annulus 44 formed in the inner surface of said sleeve. An annulus 34a on the exterior of said sleeve is dimensioned to correspond with proximate annulus 34 with which it cooperates and a plurality of radially extending openings 45 connect annulus 34a with the interior area of said sleeve. One end of sleeve 42 is stepped down by means of a reduced diameter portion 46 extending therefrom and a shoulder like portion, formed where said reduced portion joins the sleeve (see Figs. 5 and 6), presents a peripherally extending surface 46a normally disposed with respect to the longitudinal axis of movement of the sleeve. A plurality of inclined openings 47 extend generally radially through the juncture of said sleeve with said reduced diameter portion and open into an annulus 48 in the interior of said sleeve. An external shoulder 49 at the upper end of said sleeve is provided to receive a coil spring 50 which is fixedly positioned by a closure plug 51, in turn, removably affixed in position by a snap ring 52 which rests in a groove 53 in the enlarged portion 31 of bore 29.

A centrally disposed and longitudinally extending opening 54 in the closure plug or sealer bushing member 51 is adapted to slidably receive one end of a piston-like spool, indicated generally by the reference numeral 55, which includes a shank or shaft-like body portion 56 dimensioned to be axially slidable in the opening 54, while the opposite end of said shank has a reduced section portion 57 that fits into a coil spring 58 that, in turn, rests or nestles in the hollowed-out closure bushing 39. A plurality of lands 59, 60, 61 and 62 axially spaced along the shaft 56 serve to provide groove-like areas 63, 64 and 65 between the lands which cooperate with the various radial openings through the sleeve 42 for selectively controlling the passage of fluid therethrough as will subsequently be more fully explained.

A transverse or radially extending passage 66, in spool shaft 56, opens into groove 63 and communicates with an axially extending passage 67 whose opposite end communicates with another radially extending passage 68 that opens into groove 65 so as to permit the passage of fluid from one groove to the other through the center of said shaft.

Suitable pressure sealing means such as is indicated at 51a and 39a, respectively, may be provided to prevent leakage of fluid around the respective closure plug members 51 and 39.

A foot operated treadle member or pedal 69 is pivotally mounted on a bracket 70 which, in turn, is supported on the base or support 13 and fixedly secured thereto, by suitable means such as the bolts 12 and 12a. Depending from said pedal is a loop portion 71 that is adapted to engage one end of the spool shaft 56 and slidably actuate said spool against the reactive force of the spring 58.

*Operation*

In the present illustration the proposed valve mechanism is shown installed in a hydraulic circuit which actuates a hydraulic clutch mechanism, although it will be understood that this is only one preferred application of the device and hence the invention should not be limited to the specific embodiment shown and described herein.

Assuming first a situation wherein the hydraulically actuated clutch (not shown) is engaged, in which case the treadle valve 10 would then be in the position illustrated in Figure 1 with the spool 55 in its up or released position and, by virtue of the reactive force of spring 58 and the absence of any force on the pedal 69, said spool would be abutting the upper stop bushing 51. In this position of the spool fluid pressure is freely admitted from pump 17 through inlet port 14, annulus 33, openings 43, annulus 44, and groove 63 into radial passage 66. From passage 66 the fluid flows through axial passage 67 and connecting passage 68 into groove 65 and annulus 48, thence through openings 47 into annulus 35 and out through the work port or load opening 22 into conduit 23 and through the selector valve 24 and conduit 25 into cylinder 26, of clutch actuating mechanism 27, where said fluid pressure will serve to hold or maintain the piston 26a, disposed therein, moved to its extreme right-hand position as viewed in Fig. 1, against the reactive force of the compressed spring 26b in said cylinder, whereupon the clutch assumes its engaged position. When this condition is attained, since the clutch is filled, and the fluid pressure being at its maximum, hydraulic pressure will react against the unbalance of area at annulus 35 to push the sleeve 42 against the reaction of spring 50, which spring force is compatible to the pressure required to operate the clutch, up against the stop or closure bushing 51. The unbalance of area adjoining annulus 35 results from the shoulder, formed at the juncture of sleeve 42 and reduced diameter end portion 46, which presents a surface 46a normal to the axis of said sleeve and angularly inclined with respect to that of the fluid flow and thus offers a surface against which the thrust of the pressure may react to maintain the sleeve in its upper position against the reactive force of its spring 50. The system components under this condition will be in the positions as illustrated in Figure 1.

When the foot treadle or pedal 69 is partially depressed to start releasing or disengagement of the clutch, the valve components will assume the positions shown in Figure 2. When the pedal is depressed fluid pressure received in the transverse passage 68 from pump 17 is prohibited from entering the work or discharge port opening 22 because the clutch actuating cylinder is already filled and under pressure. Such axial movement of the spool 55 positions the land 61 thereon partially in register with the annulus 48, but, since the axial width of land 61 is slightly less than that of annulus 48, fluid under pressure will pass in restricted fashion around said land into groove 64 from whence it may flow through radial openings 45, in sleeve 42, into annulus 34 and out through exhaust port opening 20 and conduit 21 into reservoir 19. As the downward axial movement of the valve spool is continued, by virtue of pressure on pedal 69, spring 58 is compressed, and when the spool finally reaches the end of its stroke it engages the hollow stop bushing 39. Movement of spool 55 causes the land 61 thereon to ride past the annulus 48 thus sealing off the outlet from passage 68 and cutting off further flow of fluid under pressure from pump 17. The load port opening 22 now has unrestricted communication with reservoir 19 by way of inclined openings 47, groove 64, radial openings 45, annulus 34a—34 and exhaust port opening 20 into conduit 21. Under this condition, the reactive force of the spring 26b in the clutch actuating mechanism 27 would become operative to allow movement of the piston 26a therein to the left (as shown in Fig. 1) thus emptying cylinder 26 and concurrently effecting disengagement or release of the clutch (not shown). When the pressure in the area of annulus 35 is reduced, pressure against the shoulder surface 46a of sleeve 42 is also reduced whereupon the reactive force of spring 50 becomes effective for overriding said pressure and causing sleeve 42 to follow the axial movement of spool 55 until it also engages the stop bushing 39. In this instance, the components of the valve will assume the positions illustrated in Fig. 3 and the clutch will then be fully released.

To start the action or sequence of operations which will again engage the clutch, pressure on pedal 69 is slightly released and spool 55, because of the reactive force of spring 58 when pedal pressure is released, is moved axially to a position substantially as shown in Fig. 4. With movement of land 61 past annulus 48 fluid pressure from pump 17 is permitted to flow by way of inlet port opening 14, passages 66, 67 and 68, annulus 48 and openings 47 into work port opening 22 and into clutch actuating mechanism 27 to start refilling the cylinder 26 thereof. As pressure builds up in port opening 22, the pressure begins to act on the shoulder surface 46a of sleeve 42, in the areas of annulus 35 and openings 47, and eventually will be sufficient to override the reactive force of spring 50 and cause sleeve 42 to move axially and follow-up the movement of spool 55 in its upward axial movement. When this happens, the components of the valve will again assume the positions shown in Fig. 2. As the pedal is further released, the spool will return to the position shown in Fig. 1 and when the clutch actuating cylinder is completely filled and the clutch fully engaged, pressure on the shoulder surface portion 46a of sleeve 42 will make the pressure-sensing mechanism operative and cause the sleeve to follow-up the upward movement of spool 55 until said sleeve again engages the upper stop bushing 51, as shown in Fig. 1.

Passages 36, 37 and 38, which communicate with exhaust port opening 20, serve to provide release for fluid trapped behind the ends of the sleeve follower or bushing 42 and for conductting said fluid, by way of conduit 21, back to reservoir 19.

When it is desired to provide limited movement for the associated actuated apparatus, such as partial engagement or disengagement of the clutch in the present instance in order to permit creeping or other minute incremental movements, the foot treadle is pressed a limited amount thus causing the valve mechanism to follow with a corresponding limited movement. Assume, for instance, it is desired to partially disengage the clutch to effect a slippage thereof so as to move a vehicle into or out of a position at a creeping speed. In this case, the pedal 69 would upon being depressed cause the valve components to be moved from the positions shown in Fig. 1 to new positions. When the spool 55 has moved downward sufficiently to have land 61 thereon clear its contact with sleeve 42 there will be provided an orifice-like opening adjoining annulus 48 that will permit fluid from discharge port opening 22 to pass into groove 64 and from there through radial openings 45 to the annulus 34a—34 and thence into exhaust port opening 20 and conduit 21 to reservoir 19. This leakage of fluid relieves the pressure in the clutch and permits the reactive spring 26b in the clutch actuating mechanism 27 to become operative to effect a slight release or partial disengagement thereof. Now when the pressure in load port opening 22 is thus decreased, the pressure against the shoulder surface portion 46a of sleeve 42 is correspondingly decreased and the reactive spring 50 may then become operative to cause said sleeve to move downward and follow-up the movement of spool 55, whereupon the valve components will then assume the positions shown in Fig. 2. At this time, a balance of pressure will be effected because a limited amount of fluid discharged from passage 68 and around land 61 into annulus 48 serves to prevent further release of pressure from the clutch thereby maintaining the clutch in the desired partially released or disengaged condition. Further or additional incremental movements of the clutch may be accomplished by slight additional movements of spool 55 thus effecting the limited incremental movements thereof desired, while, at the same time, maintaining pressure in the clutch or other similarly operated apparatus associated with the hydraulic system.

From the above it will be appreciated that the herein described valve mechanism provides a valve that readily permits the feathering action or incremental movement so frequently desired in the operation of hydraulic circuits. Furthermore, the proposed valve permits not only control of the operation of the circuit but will also hold any pressure desired in an associated hydraulically actuated apparatus. Although only a preferred form of the invention has been illustrated, and that form described in detail, it will be apparent to those skilled in the art that various modifications may be made therein without departing from the spirit of the invention or from the scope of the appended claims.

What is claimed is:

1. Fluid flow control mechanism, comprising: a casing having a chamber with inlet, exhaust and load ports spaced longitudinally thereof; inner and outer valve members disposed for movement in said chamber to establish communication between predetermined ports, said valve members being movable relative to said casing and to one another; said inner valve member being movable responsive to force externally applied thereto; said outer valve member being movable responsive to fluid pressure within said casing; means formed by said valve members and casing in one of the relative positions thereof to establish communication between said inlet and said load ports; said means being adapted in another of the relative positions of said members to establish restricted communication between said inlet port simultaneously with said load and exhaust ports; yieldable means between the outer valve member and said casing tending to maintain the relative positions thereof; yieldable means between the inner valve member and said casing opposing the movement of said inner valve member; and additional means formed in said casing to establish communication between said exhaust port and the end areas of said chamber in all relative positions of said valve members.

2. Fluid flow control mechanism, comprising: a casing having a chamber with inlet, outlet and load ports spaced longitudinally thereof; inner and outer valve elements disposed for movement in said chamber to establish communication between certain of said ports, said valve elements being movable longitudinally in infinitely variable increments relative to said casing and to one another; said inner valve element being movable in response to force externally applied thereto; yieldable means between said inner valve element and said casing opposing the movement of said inner valve element; said outer valve element being movable responsive to fluid pressure extant in said load port; yieldable means between the outer valve element and said casing tending to oppose the movement thereof and tending to maintain the relative positions of said valve elements; means formed by said valve elements and casing in one of the relative positions thereof to establish communication between said inlet and said load ports; said means being adapted in another of the relative positions of said elements to establish limited communication between said inlet port simultaneously with said load and outlet ports; and additional means formed in said casing to establish communication between said outlet port and the end areas of said chamber in each of the relative positions of said valve elements.

3. In a hydraulic system wherein fluid pressure from a source is directed to a hydraulically actuated device, a control valve, comprising: a valve casing having a first port for admitting fluid under pressure from the source, a second port for transmitting fluid under pressure to the source, and a third port for admitting fluid under pressure to the hydraulically actuated device; said casing having a chamber therein communicating with each of said ports; inner and outer valve elements disposed in said chamber and being movable relative to said casing and to one another to control communication between certain of said ports; said inner valve element being movable in small increments responsive to externally applied force; yieldable means between said inner valve element and said casing opposing the movement thereof; said outer valve element being movable in small increments responsive to fluid pressure within said casing; yieldable means between said outer valve element and said casing tending to maintain the relative positions thereof; means formed by said valve elements and casing defining fluid passages communicating in one of the relative positions thereof with said first port and third ports, and in another of the relative positions thereof communicating simultaneously with said first, second and third ports; and additional means formed in said casing defining passages communicating with said second port and the end areas of said chamber in all relative positions of said valve elements.

4. In a hydraulic system wherein fluid pressure from a source is directed to a hydraulically actuated device, a control valve, comprising: a valve casing having an inlet port for admitting fluid under pressure from the source, an outlet port for transmitting fluid under pressure to the source, a load port for admitting fluid under pressure to the hydraulically actuated device, and a chamber therein communicating with each of said ports; inner and outer valve elements disposed in said chamber and movable relative to said casing and to one another to control transmission of fluid between certain of said ports; said inner valve element being movable in small increments responsive to externally applied force to effect corresponding small increments of movement in the hydraulically actuated device; yieldable means between said inner valve element and said casing opposing the movement thereof; said outer valve element being movable responsive to fluid pressure within said load port; yieldable means between said outer valve element and casing opposing the movement of said outer element caused by the fluid pressure in said load port and operative for maintaining the relative positions of said elements; means formed by said valve elements and casing defining fluid passages for transmitting fluid under pressure in one relative position of said elements from said inlet to said load ports, and in another of the relative positions thereof for transmitting fluid under pressure from the inlet port simultaneously to the outlet and load ports; and additional means formed in said casing defining fluid passages for transmitting fluid between the end areas of said chamber and the said outlet port.

5. In a hydraulic system wherein fluid pressure from a source is directed to a hydraulically actuated device, a control valve, comprising: a valve casing having an inlet port for admitting fluid under pressure from the source, an outlet port for transmitting fluid under pressure to the source, a load port for admitting fluid under pressure to the hydraulically actuated device, and a chamber therein communicating with all of said ports; inner and outer valve elements disposed in said chamber and movable relative to said casing and to one another to control flow of fluid between certain of said ports; said inner valve element being movable in small increments responsive to externally applied force and operative upon movement to effect corresponding small increments of movement in the hydraulically actuated device; yieldable means between said inner valve element and said casing opposing the movement thereof; yieldable means between said outer valve element and casing opposing the movement of said outer element and operative for maintaining the relative positions of said elements; said outer valve element having an exterior portion thereof disposed to receive the force of the fluid pressure within said load port and cooperative with the yieldable means of said outer element to effect the movement of said outer element in a movement that follows an immediately preceding movement of said inner element; means formed by said valve elements and casing defining fluid passages for transmitting fluid under pressure in one relative position of said elements from said inlet to said load ports, and in another of the relative positions thereof for transmitting fluid under pressure from the inlet port simultaneously to the outlet and load ports; and additional means formed in said casing defining fluid passages for transmitting fluid between the end areas of said chamber and the said outlet port.

6. The valve structure defined in claim 5 and further characterized by having the elements therein operatively arranged so that movements of said elements and of the hydraulically actuated device may be accomplished in infinitely variable increments.

7. In a hydraulic system wherein fluid pressure from a source is directed to a hydraulically actuated device, a control valve, comprising: a valve casing having an inlet port for admitting fluid under pressure from the source, an outlet port for transmitting fluid under pressure to the source, a load port for admitting fluid under pressure to the hydraulically actuated device, and a chamber therein communicating with all of said ports; inner and outer valve members disposed in said chamber and movable relative to said casing and to one another to control flow of fluid between certain of said ports; said inner valve member being movable in infinitely variable increments responsive to externally applied force to effect corresponding infinitely variable increments of movements in the hydraulically actuated device; yieldable means between said inner valve meember and said casing opposing the movement thereof; yieldable means between said outer valve member and casing opposing the movement of said outer member and operative for maintaining the relative positions of said members; said outer valve member including means cooperative with the yieldable means of said outer member and responsive to fluid pressure within said load port for moving said outer member and effecting a movement thereof that follows and is in the same direction as that of an immediately preceding movement of said inner valve member; means formed by said valve members and casing defining fluid passages for transmitting fluid under pressure in one relative position of said members from said inlet to said load ports, and in another of the relative positions thereof for transmitting fluid under pressure from the inlet port simultaneously to the outlet and load ports; and additional means formed in said casing defining fluid passages for transmitting fluid between the end areas of said chamber and the said outlet port.

8. In a hydraulic system wherein fluid pressure from a source is directed to a hydraulically actuated device, a control valve, comprising: a valve casing having an inlet port for admitting fluid under pressure from the source, an inlet port for transmitting fluid under pressure to the source, a load port for admitting fluid under pressure to the hydraulically actuated device, and a chamber therein communicating with all of said ports; inner and outer valve members disposed in said chamber and movable relative to said casing and to one another to control flow of fluid between certain of said ports; said inner valve member being movable in infinitely variable increments responsive to externally applied force to effect infinitely variable increments of movements in the hydraulically actuated device; yieldable means between said inner valve member and said casing opposing the movement thereof; yieldable means between said outer valve member and casing opposing the movement of said outer member and operative for maintaining the relative positions of said members; said outer valve member being fashioned with an end portion thereof having a reduced diameter and having formed at one end thereof an exterior peripherally extending surface angularly disposed with respect to the longitudinal axis of movement of said members; said peripherally extending surface being cooperative with the yieldable means of said outer member and with fluid pressure in said load port to effect a movement thereof that is a follow-up to an immediately preceding movement of said inner valve member; means formed by said valve members and casing defining fluid passages for transmitting fluid under pressure in one relative position of said members from said inlet to said load ports, and in another of the relative positions thereof for transmitting fluid under pressure from the inlet port simultaneously to the outlet and load ports; and additional means formed in said casing defining fluid passages for transmitting fluid between the end areas of said chamber and the said outlet port.

9. The structure defined in claim 8 further characterized by having the means defining fluid passages for transmitting fluid under pressure between certain of said ports include therein a plurality of passages that extend through said peripherally extending surface angularly disposed with respect to the longitudinal axis of said outer valve member and that communicate with the interior and exterior surfaces of said outer valve member.

10. In a hydraulic system wherein fluid pressure from a source is directed to a hydraulically actuated device, a control valve, comprising: a valve casing having an inlet port for admitting fluid under pressure from the source, an outlet port for transmitting fluid under pressure to the source, a load port for admitting fluid under pressure to the hydraulically actuated device, and a bore therein communicating with all of said ports; inner and outer valve elements disposed in said bore and movable relative to said casing and to one another to control flow of fluid between certain of said ports; said inner valve element being movable in small increments responsive to externally applied force and operative to effect corresponding small increments of movement in the hydraulically actuated device; yieldable means between said inner valve element and said casing opposing the movement thereof; said outer valve element being movable responsive to fluid pressure within said load port; yieldable means between said outer valve element and casing opposing the movement of said outer element caused by the fluid pressure in said load port and operative for maintaining the relative positions of said elements; said inner valve element having an axially extending passage therein communicating with transverse passages axially spaced therealong and opening into the outer surface of said inner element; said outer valve element having a plurality of radially extending passages therethrough disposed for establishing communication between certain of said ports by way of the passages in said inner element, and operative in one relative position of said valve elements for transmitting fluid under pressure from said inlet port to said load port, and in another of the relative positions thereof for transmitting fluid under pressure from the inlet port simultaneously to the outlet and load ports; and additional means formed in said casing defining fluid passages for transmitting fluid between the end areas of said bore and said outlet port in all relative positions of said valve elements.

11. The valve structure defined in claim 10 and further characterized by having the valve elements disposed so that portions of the passages defined between said inlet port and said outlet and load ports have more limited cross-sectional areas in one of the relative positions of the valve elements than in another of said relative positions thereof.

12. In a hydraulic system wherein fluid pressure from a source is directed to a hydraulically actuated device, a control valve, comprising: a valve casing having an inlet port for admitting fluid under pressure from the source, an outlet port for transmitting fluid under pressure to the source, a load port for admitting fluid under pressure to the hydraulically actuated device, and a bore therein communicating with all of said ports; inner and outer valve elements disposed in said chamber and movable relative to said casing and to one another to control flow of fluid between certain of said ports; said inner valve element being movable in small increments responsive to externally applied force and operative to effect small increments of movement in the hydraulically actuated device; yieldable means between said inner valve element and said casing opposing the movement thereof; said outer valve element being movable responsive to fluid pressure within said load port; yieldable means between said outer valve element and casing opposing the movement of said outer element caused by the fluid pressure in said load port and operative for maintaining the relative positions of said elements; said inner valve element having an axially extending passage therein communicating with transverse passages axially spaced therealong and opening into the outer surface of said inner element; said outer valve element having a plurality of at least three axially spaced and transversely extending openings therein disposed so that each of said openings cooperates with a respective proximate port and with the passages in said inner element to establish fluid carrying passages in one relative position of the valve elements connecting said inlet port with said load port, and in another relative position thereof establishing fluid-carrying passages connecting the inlet port for simultaneous restricted communication with the load and outlet ports; and additional means formed in said casing defining fluid passages for transmitting fluid between the end areas of said bore and said outlet port in any of the relative positions of said valve elements.

References Cited in the file of this patent

FOREIGN PATENTS

| | | |
|---|---|---|
| 314,523 | Germany | Sept. 25, 1919 |
| 537,029 | Great Britain | June 5, 1941 |
| 494,950 | Italy | Sept. 10, 1952 |